United States Patent [19]

Kech

[11] Patent Number: 5,034,644
[45] Date of Patent: Jul. 23, 1991

[54] CANNED ELECTRIC MOTOR

[75] Inventor: Hans-Jürgen Kech, Herdecke, Fed. Rep. of Germany

[73] Assignee: Wilo-Werk GmbH & Co. Pumpen- und Apparatebau, Dortmund, Fed. Rep. of Germany

[21] Appl. No.: 454,777

[22] Filed: Dec. 19, 1989

[30] Foreign Application Priority Data

Dec. 23, 1988 [DE] Fed. Rep. of Germany ....... 3843477

[51] Int. Cl.$^5$ ...................... H02K 5/128; F04B 39/12
[52] U.S. Cl. ..................................... 310/254; 310/54; 310/86; 310/88; 417/423.11
[58] Field of Search ............... 310/45, 54, 64, 86, 310/87, 88, 89, 90, 254, 104, 260; 417/420, 423.7, 423.8, 423.11, 423.14

[56] References Cited

U.S. PATENT DOCUMENTS 2,972,308  2/1961  Haggerty ........................ 310/86
3,334,252  8/1967  Gayral ............................. 310/86
4,651,039  3/1987  Yamamoto et al. ............ 310/45
4,818,193  4/1989  Laing et al. ................. 417/423.14

FOREIGN PATENT DOCUMENTS 3538507   6/1986  Fed. Rep. of Germany ................ 417/423.14
241494   10/1986  Japan ........................ 417/423.7
372928  12/1963  Switzerland ................ 417/423.7

Primary Examiner—Steven L. Stephan
Assistant Examiner—D. L. Rebsch
Attorney, Agent, or Firm—Herbert Dubno

[57] ABSTRACT

A canned electric motor in which the stator is a laminated plate assembly which surrounds the can and the windings project beyond the laminated plate assembly on both sides. The bottom of the can at the end opposite that from which the motor shaft projects is curved outward and the windings bear on the outside of the can against the curved surface of the bottom.

9 Claims, 1 Drawing Sheet

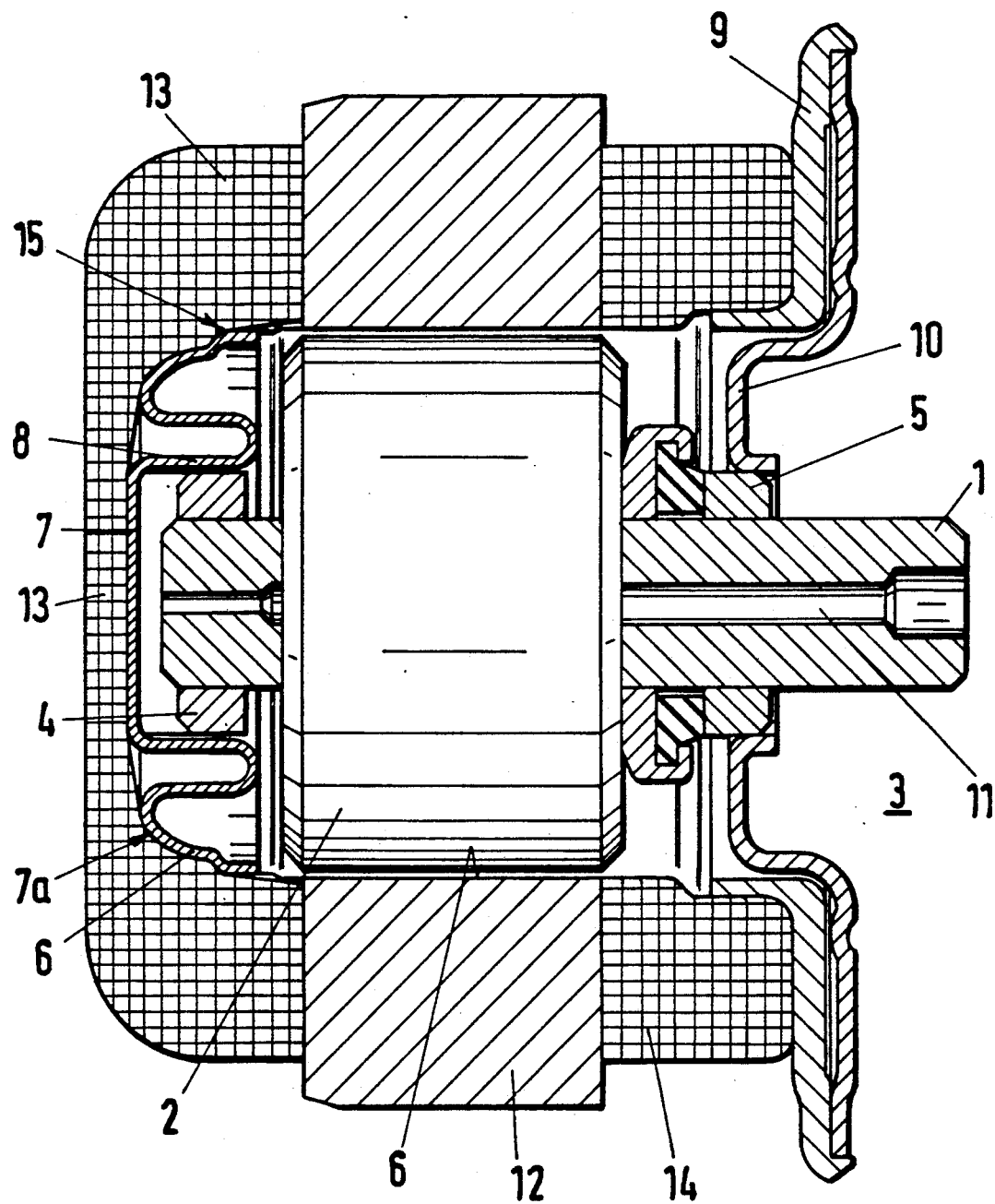

CANNED ELECTRIC MOTOR

FIELD OF THE INVENTION

My present invention relates to a canned electric motor, in particular for a pump, with a stator laminated-plate assembly, which surrounds the can and is penetrated by windings, which project beyond the stator laminated-plate assembly on both sides, the can being closed, and consequently forming its bottom at that end which is opposite the side at which the drive shaft of the motor extends to the pump.

BACKGROUND OF THE INVENTION

Canned motors for heating-system circulation pumps can be provided in cylindrical configuration as well as disc rotor and as ball-shaped motor configurations. In these configurations, the stator is mechanically separated and sealed off from the rotor. In the cylindrical design, the mechanical separation and sealing is provided by a metal can. The rotor is cooled within this can by the flow medium (heating water), which also lubricates and damps the bearing.

The production processes used for these configurations of stator and rotor differ in the stator production only insignificantly from processes for making dry-rotor asynchronous motors. The degree of automation is determined here essentially by the configuration of the stator and its characteristic design features such as, for example, by the winding construction.

A hindrance specifically in stator production is that the individual production stations vary greatly in the extent to which the required winding geometry can be automated. In particular, this hinders the fully automatic linking-up of individual production stations within stator production.

The cylindrical stator windings with open and closed cans are likewise in current use. The cylindrical stator windings are in this case arranged so as to be insulated from the metallic can by so-called overhang shields or in taped form by means of necessary air gaps. The pull-in plane of the winding (pull-in-tool) or the position of the coils in the stator space has to be chosen in this case in such a way that the slot space (coil) cannot be fully utilized electrically; the slot utilization is about 50% to 65%.

A further minimization of the motor dimensions while retaining a cylindrical winding, for example with overhang shields or with taping to maintain air gaps with respect to the can, end shield or motor housing comes up against limits or thermal motor loading or of electromagnetic utilization of the machine. The cause is to be seen in the water volume of the canned space or rotor space, which is likewise reduced by the miniaturization, and in the poor slot utilization.

Machines of the rating according to the invention (less than 500 W) and mechanical configuration have their greatest losses in the stator, i.e. so-called Cu losses or ohmic losses. With the previous design principles, the electrical insulation gaps (air or plastic) have a thermally insulting effect in the heat flow to the flow medium.

OBJECT OF THE INVENTION

The object of the invention is to provide a canned electric motor with a higher power/volume ratio, smaller dimensions and with an increase in the automation of the production by further linking-up of the production stations.

SUMMARY OF THE INVENTION

This object is achieved according to the invention by providing the bottom of the can so that it is curved outwardly and having the windings of one side of the stator laminated-place assembly bear on the outside against the curved surface of the bottom.

The new construction differs from the prior cylindrical stator/rotor design by the winding construction of the stator winding, designed with an outwardly curved can bottom, in particular as a calotte winding. A prerequisite for this design is the changeover from a cylindrical can, open on both sides, to a so-called can-pot. The end of the can must in this case be designed in the form of a calotte for support of the winding; i.e. the winding and can have the same contours.

These problems can be eliminated with the calotte-shaped winding in conjunction with the closed can. In this case, the winding is made with a varnished copper wire, capable of being baked, and is homogeneously joined mechanically to the can over the entire inner winding surface; i.e. the winding is baked to the metallic can so as to bear flat against it radially and axially.

The electrical insulation is in this case a powder coating (epoxy resin) of the can. The coating is chosen such that a very good heat transfer from the stator winding to the canned space and pump space (wet space) is achieved. Consequently, a better removal of the heat loss of the motor to the flow medium can be achieved.

This new principle opens up further possibilities of production improvement by reduction of the previous production steps and by increased linking-up of the individual production stations.

By designing the winding in calotte form (on one side), the winding can be received directly from the winding pull-in tool, since the finished winding geometry there corresponds virtually to this form. Elaborate preforming and intermediate forming measures on both sides are not needed; just a slight adaptive forming on the end plate side suffices.

The stator with calotte winding is fitted onto the subassembly of can and rotor or ready assembled parts or onto the can without rotor.

The can may in this case be used as workpiece carrier for the entire subsequent further processing of the motor or of the pump (automatic linking-up). Even the winding-up of the single-phase or three-phase windings or asynchronous machines, which is still difficult to automate, can be performed on the can, used as workpiece carrier.

Further integrated production steps with the can workpiece carrier are the final assembly of the stator on the can (stator seating), the automatic contacting, the automatic baking of the winding and electrical testing of the stator winding with completed can, i.e. including the rotor subassembly. Consequently the complete final electrical checking of the motor is also possible. After this production sequence of the motor without housing, pump assembly can be performed with the same workpiece carrier. The motor housing may be made of plastic and has only a protective function.

The ready-assembled motor housing can be fitted axially on the can and contacted at the stator. This achieves a further simplification in assembly and disassembly.

In the case of the motor concept with calotte winding, the housing is designed as a module, into which the terminal connection space has been integrated at the same time. This similarly makes possible the accommodation of components such as switch, capacitor or complete control electronics with sensor technology, for example continuous speed control, differential-pressure, temperature and volumetric-flow control.

The rear of the housing may in this case bar the rating place data and at the same time a display with an operator control panel for the indication and enquiry of operating data. A data interface (V24 or RS232) is provided in the housing module for diagnosis and condition monitoring, as well as for external central control (supervisory console). The fastening of the housing on the side of the can, designed as end plate, is made so as to be releasable for the customer and can be exchanged, for example in the case of faulty electronics. The electrical connections may be pluggable.

The concept described above is not restricted to one rating, but can be transferred completely to the series of canned motors made by the conventional design and production principle, as well as low-power dry-rotor motors with self-cooling only by convection. It can also be used in the case of fans.

The bottom of the can can have the form of a hemisphere, of a spherical segment (calotte) or of a spherical zone. The bottom of the can can be curved less in the middle region than in the adjoining marginal region. Advantageously, the bottom of the can is approximately flat in the middle region.

The bottom of the can may be more curved in the marginal region and is flat or slightly curved in the residual region.

The bottom of the can may have in section the form of a compound curve.

The insulating varnish should have a high thermal conductivity and can be produced by power coating, e.g. from an epoxy resin.

The ready-assembled motor housing can be fitted axially on the can and contacted at the stator. The fastening of the housing to the sides of the can, which are designed in particular as end plates, can be releasable. The stator may be pushed onto the can to the extent that the calotte-shaped winding region of the winding overhang rests on the can bottom and is baked on the latter. The can preferably is used as a workpiece carrier for the entire subsequent further processing of the motor or pump.

In that case, the automatable wiring-up of the single-phase or three-phase windings of asynchronous the machines is performed on the can, used as workpiece carrier and the automatic contacting, the automatic baking of the winding and electrical testing of the stator winding are performed on the cap. With the can as a workpiece carrier, the pump assembly is carried out without a motor housing for heating boiler installation, or with a motor housing for external standard pumps.

BRIEF DESCRIPTION OF THE DRAWING

The above and other objects, features and advantages of my invention will become more readily apparent from the following description, reference being made to the accompanying highly diagrammatic drawing, the sole FIGURE of which is a cross sectional view through a motor according to the invention.

SPECIFIC DESCRIPTION

The canned electric motor (canned motor, wet rotor) which can be used in particular for hot-water heating systems with circulating pumps, has a hollow drive shaft 1, on which the rotor assembly 2 is fastened. The drive shaft 1 is rotatably fastened on the side facing away from the pump space 3 in a bearing 4 and on the side facing the pump space in a bearing 5. The rotor 2 is coaxially surrounded by a cylindrical can 6, which is closed on the side facing away from the pump space by a bottom 7. The bottom 7 may form an inwardly directed coaxial annular bead 8, which holds the bearing 4.

On the side facing the pump space 3, there is fastened to or formed on the can 6 a flange 9, which bears the partition 10 between the inside of the can and the pump space 3. The bearing 5 is fastened in this partition 10 and the drive shaft 1 projects beyond this partition 10 into the pump space 3, in order to bear with this end the pump rotor (not shown). The inside of the can 6 has flow medium flowing through it, which also flows through the coaxial hollow space 11 of the drive shaft 1.

Pushed-on on the outside, in approximately the middle, cylindrical region of the can 6, is the stator laminated-plate assembly 12, which has axially parallel slots, through which the winding wires run from the outer winding overhand 13 to the inner winding overhang 14. The bottom 7 of the can 6 is curved outwards, and the windings of the winding overhang 13 bear closely against this curved surface on the bottom on the outside.

For this purpose, the windings of the overhang 13 must only be slightly deformed, with the result that they essentially retain a curved form, which they have after winding. The bottom 7 thus forms a workpiece carrier and can have the form of a hemisphere, a spherical segment (calotte) or a spherical zone. The bottom of the can is preferably curved less in the middle region than in the adjoining marginal region. In particular, the bottom may be flat in the middle region, this flat surface then being at right angles to the axis of the motor. Furthermore, the bottom of the can may have in section the form of a compound curve.

A very firm retention of the windings is provided if the windings are baked or adhesively fixed to the bottom 7 on the outside. For this purpose, the outside surface 7a of the cylindrical region and of the curved region of the can bears a thin, electrically insulating layer 15, in particular a thin, electrically insulating varnish, with a high thermal conductivity. The layer may have been produced by powder coating. In particular, the layer is an epoxy resin.

The housing is designed as a module, integrated into which is the thermal connection space, which contains components such as switch, capacitor or complete control electronics with sensor technology, continuous speed control, differential-pressure, temperature and/or volumetric-flow control. The rear of the housing bears the rating plate data and/or at the same time a display with operator control panel for the indication and enquiry of operating data. A data interface (V24 or RS232) is provided in the housing module for diagnoses, for condition monitoring and/or for external central control (supervisory console). p The ready-assembled motor housing is fitted axially on the can 6 and contacted at the stator 12-14, with the result that a further simplification of assembly is achieved. The fastening of the housing to the sides of the can 6, which are designed in particular as end plates, is releasable and can be exchanged, for example in the case of faulty electronics. For this purpose, the electrical connections are pluggable.

The stator 12-14 is pushed onto the can 6 to the extent that the, in particular calotte-shaped, winding region of the winding overhang 13 rests on the can bottom 7 and is baked on the latter. The can 6 is used as workpiece carrier for the entire subsequent further processing of the motor or pump. The automatable wiring-up of the single-phase or three-phase windings or asynchronous machines is also performed on the can 6, used as workpiece carrier.

Furthermore, the final assembly of the stator 12-14, the automatic contacting, the automatic baking of the winding and electrical testing of the stator winding can be performed on the can 6. The pump assembly without motor housing for heating boiler installation or with motor housing for external standard pumps is also performed with the can 6 as workpiece carrier.

The production process proceeds in the following steps:

punching and stacking of the laminated plates for the stator assembly.
surface coating of can and stator assembly (including slots).
assembly of the chamber block,
winding and pulling-in of the windings into the stator assembly,
slight preforming of the outer winding overhang 13,
assembly of the stator on the can,
contacting and testing of the windings,
slight pressing of the windings of the winding overhang 13 against the can bottom and baking of the windings on the bottom,
final check of the structural unit produced thus far,
assembly of the motor housing,
fastening of the motor housing to the pump housing.

I claim:

1. A motor-pump assembly, comprising:
   a housing defining a pump chamber;
   a pump drive shaft extending into said chamber and provided with a passage for conducting a fluid through said shaft;
   a rotor traversed by said fluid and mounted on said shaft;
   a stator surrounding said rotor and formed with a stator winding extending around a rear of said rotor and defining a space with said rotor into which a rear end of said shaft extends, said winding having an annular spherically segmental zone merging into a middle region of said winding extending generally transversely to said shaft and an axis of rotation thereof; and
   a can connected to said housing and having a cylindrical portion surrounding and enclosing said rotor, and having a can bottom formed with a closed bottom portion in contact with said winding in said middle region and shaped to conform thereto, and a curved portion of spherical segmental configuration lying against said annular zone of said winding and shaped to conform thereto while forming a continuous transition between said bottom portion and said cylindrical portion, said bottom and curved portions enclosing said end of said shaft, said can receiving said fluid through said passage.

2. The motor-pump assembly defined in claim 1 wherein said winding is bonded to said can bottom to enable said bottom of said can to form a carrier for said winding.

3. The motor-pump assembly defined in claim 1 wherein said can bottom has generally the form of a hemisphere.

4. The motor-pump assembly defined in claim 1 wherein said bottom portion is curved less than said curved portion of said can bottom.

5. The motor-pump assembly defined in claim 1 wherein said can bottom portion is approximately flat.

6. The motor-pump assembly defined in claim 1 wherein said can bottom has in section a compound curve configuration.

7. The motor-pump assembly defined in claim 1 wherein said windings are baked to said can bottom on an outer surface thereof.

8. The motor-pump assembly defined in claim 1 wherein outer surfaces of said cylindrical portion and said curved portion are formed with a thin electrically insulating layer of a varnish of high thermal conductivity.

9. The motor-pump assembly defined in claim 8 wherein said layer is an epoxy resin.

* * * * *